United States Patent
Ootaguro et al.

(12)

(10) Patent No.: US 6,191,841 B1
(45) Date of Patent: Feb. 20, 2001

(54) METHOD OF MANUFACTURING LIQUID CRYSTAL DISPLAY CELL

(75) Inventors: Hiroshi Ootaguro, Fukaya; Kazuyoshi Okano, Ibo-gun, both of (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/450,697

(22) Filed: Nov. 30, 1999

(30) Foreign Application Priority Data

Nov. 30, 1998 (JP) .................................................. 10-340067

(51) Int. Cl.$^7$ .................................................. G02F 1/1339
(52) U.S. Cl. ............................................. 349/190; 349/153
(58) Field of Search ...................... 349/190, 153

(56) References Cited

U.S. PATENT DOCUMENTS

| | | | |
|---|---|---|---|
| 4,401,537 | * | 8/1983 | Chern et al. ..................... 204/159.11 |
| 5,150,239 | * | 9/1992 | Watanabe et al. .................... 359/80 |
| 5,387,445 | * | 2/1995 | Horiuchi et al. ....................... 428/1 |
| 6,013,339 | * | 1/2000 | Yamada et al. ....................... 428/1 |

FOREIGN PATENT DOCUMENTS 4-157425   5/1992   (JP) .

* cited by examiner

Primary Examiner—Kenneth Parker
Assistant Examiner—Mike Qi
(74) Attorney, Agent, or Firm—Pillsbury Madison & Sutro LLP Intellectual Property Group (57) ABSTRACT

A peripheral region of an array substrate is coated with a sealing agent in a manner to surround a display region, followed by arranging an opposite substrate to face the array substrate with a predetermined gap defined therebetween. Then, the sealing agent is heated for the curing while pressurizing the array substrate and the opposite substrate so as to seal these two substrates. After the sealing step, a liquid crystal composition is injected into the clearance between the array substrate and the opposite substrate through a liquid crystal injecting port formed in the sealing agent. The sealing agent should maintain a viscosity of at least 110 poises during the curing step of the sealing agent. The viscosity of the sealing agent, which is provided by a resin composition, is controlled by, for example, using a main component resin having a high molecular weight, a solvent having a low boiling point, and a curing agent that is liquid at room temperature.

9 Claims, 5 Drawing Sheets

METHOD OF MANUFACTURING LIQUID CRYSTAL DISPLAY CELL

BACKGROUND OF THE INVENTION

The present invention relates to a method of manufacturing a liquid crystal display cell.

A liquid crystal display device, which is thin, light in weight, and permits suppressing power consumption, is widely used as a display device for a notebook type or sub-notebook type portable personal computer. In recent years, an enlargement in the display capacity or the display area and an improved image quality are required for the liquid crystal display device in accordance with improvement in the performance of the personal computer.

In general, a liquid crystal display device comprises a liquid crystal display cell including two insulating substrates, e.g., glass substrates arranged to face each other with spacers interposed therebetween. These two glass substrates are bonded to each other with a sealing agent, and a liquid crystal material is held between the two glass substrates. The liquid crystal display cell of the particular construction is assembled as follows.

In the first step, two glass substrates are held by suction on a pair of upper and lower stages arranged to face each other. For example, a first glass substrate having a large number of electrodes (scanning electrodes, signal electrodes, and etc.) formed on a main surface and having a peripheral region outside the display region coated with a sealing agent in the shape of a rectangular frame is held on the lower stage such that the surface of the first glass substrate on which the electrodes and the sealing agent are formed faces upward. Also, spacers, e.g. plastic beads, for ensuring a gap between the two glass substrates is arranged on the upper surface of the first glass substrate. On the other hand, a second glass substrate having an opposite electrode, a color filter, etc. provided on a main surface is held by suction on the upper stage such that the main surface of the second glass substrate faces downward.

Then, the first and second glass substrates held on the lower and upper stages, respectively, are superposed one upon the other, followed by moving these glass substrates in X-, Y- and θ-directions to align the positions thereof. Further, these two glass substrates are provisionally fixed to each other with, for example, an ultraviolet light curing type adhesive to prevent these two glass substrates from being deviated from each other. The resultant structure is called hereinafter a cell assembly.

Then, the sealing agent is cured under heat while pressurizing the cell assembly to set the gap between the two glass substrates at a predetermined value, thereby sealing the two insulating substrates. Further, a liquid crystal composition is injected into the vacant cell, followed by sealing the injecting port of the liquid crystal composition with a sealing agent such as an ultraviolet light curing resin.

In recent years, a new system is employed in the step of sealing he two glass substrates by curing under heat the sealing agent included in the method of manufacturing such a liquid crystal display cell. Specifically, it was customary in the past to arrange scores of cell assemblies in a superposed fashion within a press tool and to heat the superposed cell assemblies within a hot air circulating type oven while pressurizing the cell assemblies. Alternatively, a far infrared ray heater was used for heating the superposed cell assemblies. However, employed in recent years is a one-by-one sealing method using an air pressurizing system in which the cell assemblies are heated one by one while pressurizing the cell assembly with an atmospheric pressure.

The one-by-one sealing method makes it possible to improve the accuracy of the gap between the glass substrates and to improve the image quality of the liquid crystal display device. Also, since the cell assemblies are heated one by one, the heating efficiency can be improved and the sealing agent can be cured in a short time.

However, where the temperature is rapidly elevated in the conventional one-by-one sealing method, due to the influence of the gas in the cell assembly, the sealing agent layer is broken or bubbles are generated in the sealing agent layer so as to lower the sealing strength between the two substrates. As a result, the reliability of the liquid crystal display cell is lowered.

BRIEF SUMMARY OF THE INVENTION

The present invention has been contrived in consideration of the above circumstances, and its object it to provide a method of manufacturing a liquid crystal display cell, which makes it possible to prevent the break of the sealing agent layer and the bubble generation within the sealing agent layer in the step of sealing the substrates by curing the sealing agent, thereby manufacturing a liquid crystal display cell having an improved reliability.

According to a first aspect of the present invention, there is provided a method of manufacturing a liquid crystal display cell, comprising the steps of coating a first surface of a first substrate with a sealing agent in a manner to surround an outer periphery of a display region of the first substrate; arranging a second substrate to face the first substrate a predetermined distance apart from the first surface of the first substrate; heating the sealing agent while pressurizing the first and second substrates to cure the sealing agent so as to seal the first and second substrates; and injecting a liquid crystal material into the gap between the first and second substrates, wherein the sealing agent maintains a viscosity of at least 110 poises in the-curing step of the sealing agent.

In the method of the present invention for manufacturing a liquid crystal display cell, used is a sealing agent that is expanded at a rate of 4 $\mu$m/sec or less in the curing step of the sealing agent.

In the present invention, the viscosity of the sealing agent throughout the curing step of the sealing agent is limited to 110 poises or more. The viscosity of the sealing agent is related to the break or the bubble generation within the sealing agent layer in the step of curing the sealing agent. Specifically, if the temperature of the sealing agent is rapidly elevated, the viscosity of the sealing agent is rapidly lowered. In this case, it is impossible for the entire gas within the cell expanded by the heating to be released to the outside through the injecting port of the liquid crystal layer. Naturally, the remaining gas is considered to break the surface of the sealing agent layer having a lowered viscosity so as to enter the sealing agent layer, thereby forming bubbles within the sealing agent layer. Therefore, if the sealing agent maintains a viscosity high enough to withstand sufficiently the pressure of the thermal expansion of the gas within the cell throughout the step of curing the sealing agent, it is considered possible to prevent completely the bubble generation and the like within the sealing agent layers.

As a result of various experiments, the present inventors have found that a sealing agent layer having a viscosity of at least 110 poises is capable of withstanding the thermal expansion of the gas within the cell. In other words, it has been found that the gas is incapable of permeating through the sealing agent layer having a viscosity of at least 110 poises.

A sealing agent maintaining a viscosity of at least 110 poises throughout the curing step of the sealing agent can be obtained by improving the conventional epoxy series or phenolic series resin composition.

To be more specific, the reasons for the viscosity reduction caused by the temperature elevation in the conventional sealing agent are considered to be as follows:

1) The main component of the sealing agent such as an epoxy resin has a small molecular weight and, thus, has a low viscosity at room temperature;
2) The solvent mixed in the sealing agent has a high boiling point and, thus, fails to be evaporated sufficiently in the pre-curing step performed before the sealing step, with the result that the viscosity of the sealing agent is lowered; and
3) The curing agent used is solid at room temperature and is melted temporarily by heating to form a liquid so as to lower the viscosity of the entire sealing agent.

Therefore, a sealing agent maintaining a viscosity of at least 110 poises over the heating temperature range, e.g., 10 to 120° C., in the curing step of the sealing agent can be obtained by selecting at least one of the measures given below:

1) The epoxy resin used as a main component of the sealing agent is changed from the conventional bisphenol F type to the bisphenol A type having a large molecular weight;
2) The solvent having a lower boiling point is substituted for the conventional solvent; and
3) A curing agent that is liquid at room temperature is used.

In the present invention, the temperature elevation rate of the sealing agent in the curing step of the sealing agent should desirably set at 5 to 30° C./min, more desirably at 7 to 14° C./min. If the temperature elevation rate of the sealing agent is less than 5° C./min, it takes an unduly long time to carry out the curing treatment so that the productivity is lowered. By contraries, if the temperature elevation rate exceeds 30° C./min, the cell assembly may be deformed due to the temperature difference between the front and rear surfaces of the cell assembly so that the alignment accuracy of the cell assembly is lowered.

In the one-by-one sealing method in which the sealing is performed for each pair of substrates, the temperature elevation rate is set at as high as 5 to 30° C./min. Therefore, the present invention is particularly effective when applied to the one-by-one sealing method.

In the one-by-one sealing method, employed is an air pressurizing system in which the atmospheric pressure is utilized for the pressurizing. Therefore, the pressure can be distributed uniformly over the entire substrate surface.

In the method of the present invention for manufacturing a liquid crystal display cell, the sealing agent layer is capable of sufficiently withstanding the pressure of the gas expanded within the cell even if the sealing step of the substrates by the thermal curing of the sealing agent is carried out under a relatively high temperature elevation rate of 5 to 30° C./min because the sealing agent maintains a sufficiently high viscosity of at least 110 poises. Therefore, bubbles are not generated within the sealing agent layer, making it possible to manufacture a liquid crystal display cell of a high reliability with a high yield.

Also, in the method of the present invention for manufacturing a liquid crystal display cell, the expanding rate of the sealing agent in the step of curing the sealing agent is set at 4 $\mu$m/sec or less. As a result, the gas within the cell can be released to the outside through the injecting port for the liquid crystal material while preventing the surface of the sealing agent layer from being broken by the gas pressure. It follows that bubbles are not generated within the sealing agent layer and the sealing agent layer is not broken, making it possible to manufacture a liquid crystal display cell of a high reliability with a high yield.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A method of manufacturing a liquid crystal display cell according to an embodiment of the present invention will now be described in detail with reference to the accompanying drawings.

Figure 1:
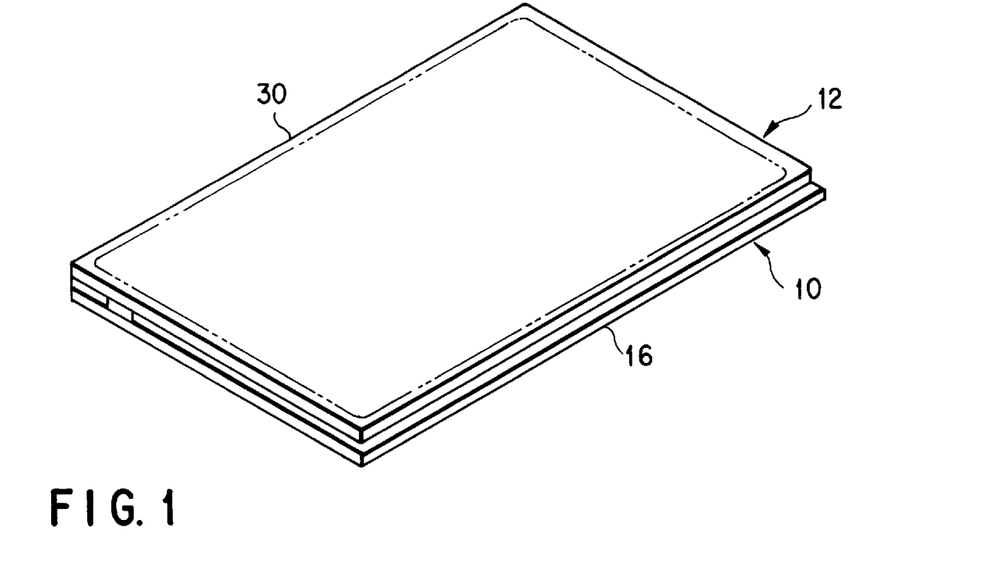
FIG. 1 is an oblique view showing a liquid crystal display cell manufactured by a manufacturing method according to one embodiment of the present invention.
Figure 2:
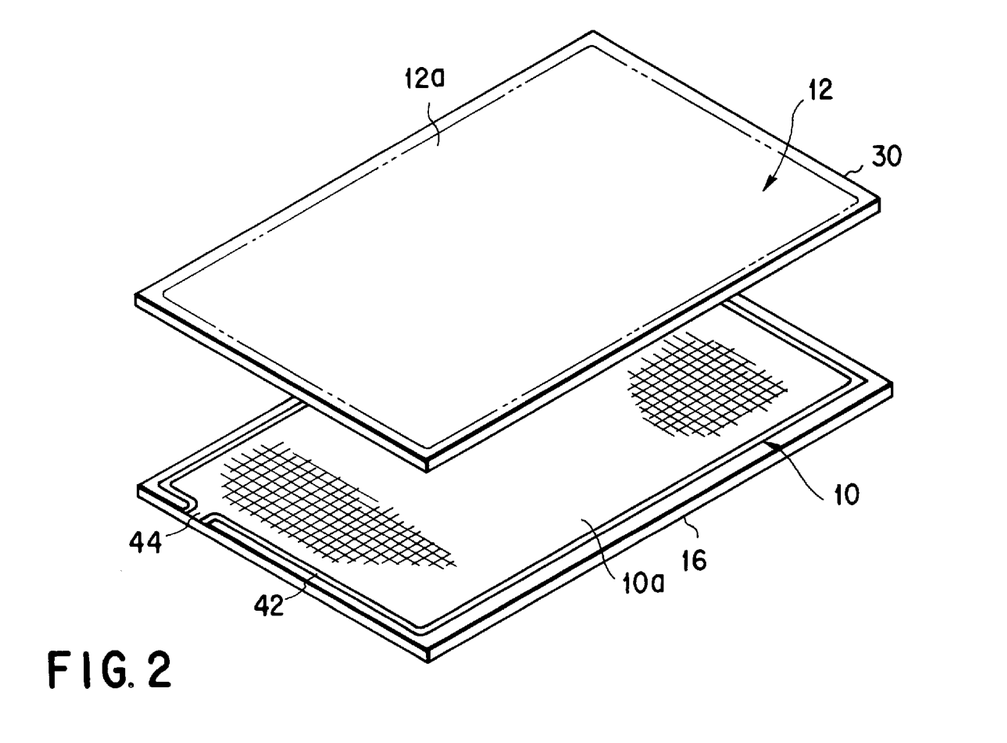
FIG. 2 is an oblique view showing in a dismantled fashion the liquid crystal display cell shown in FIG. 1.
Figure 3:
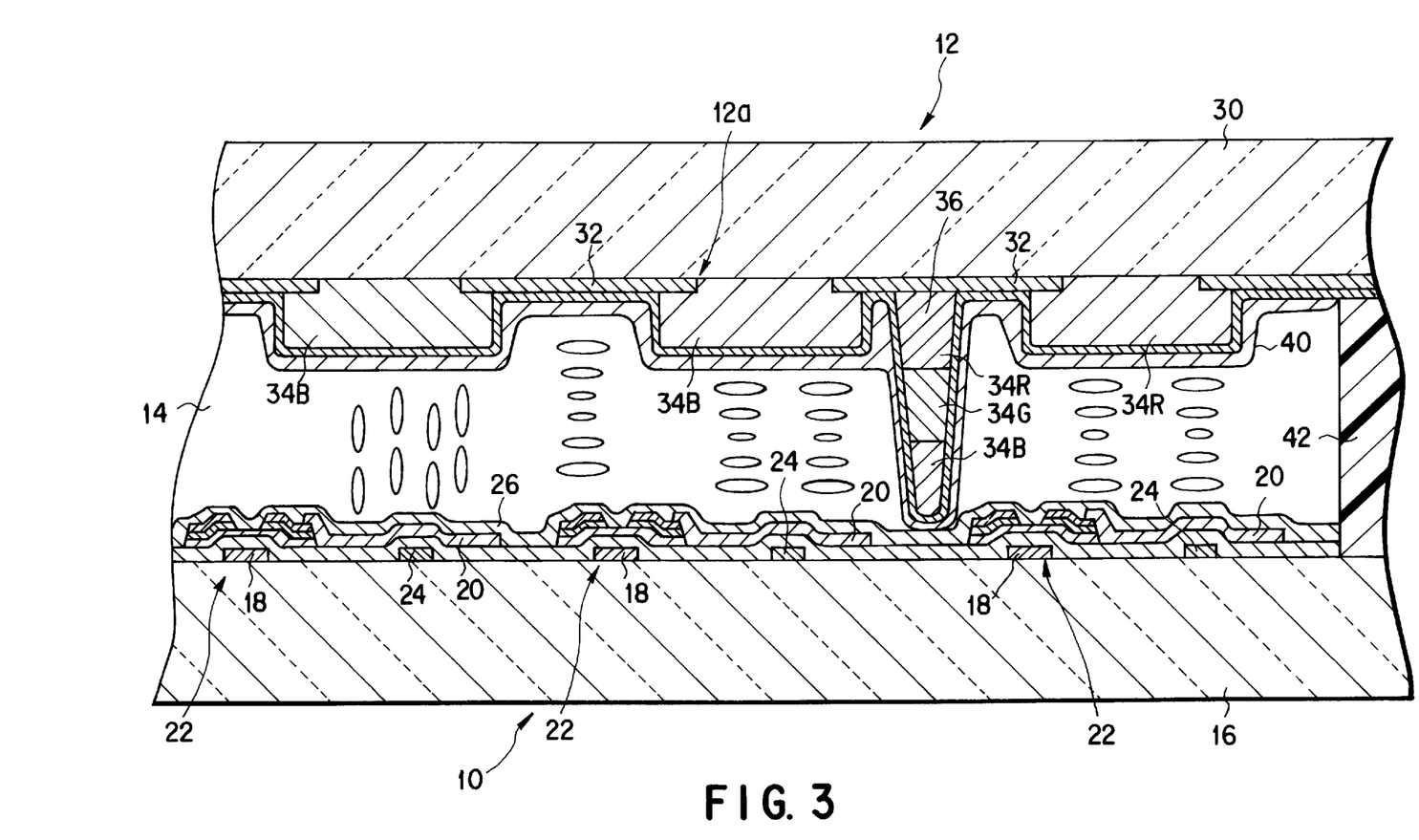
FIG. 3 is a cross sectional view showing the liquid crystal display cell shown in FIG. 1.

First of all, the construction of the liquid crystal display cell manufactured by the method of the embodiment will now be described. As shown in FIGS. 1 to 3, the liquid crystal display cell is an active matrix type liquid crystal display cell comprising a rectangular array substrate 10 and a rectangular opposite substrate 12 arranged to face the array substrate 10. A liquid crystal material 14 is sealed in the gap between these two substrates 10 and 12.

The array substrate 10 comprises a rectangular insulating substrate, e.g., a rectangular glass substrate 16 having a rectangular display region 10a formed on the surface. A large number of scanning lines 18 and signal lines (not shown) are formed in the display region 10a in a manner to form a matrix. Also, a pixel electrode 20 formed of ITO is formed in a region surrounded by each scanning line and each signal line. Each pixel electrode 20 is electrically connected to the signal line through a thin film transistor (hereinafter, called as TFT) 22.

A storage capacitor line 24 is provided below the pixel electrode 20. Also, an alignment film 26 is formed to cover the scanning lines 18, the signal lines, the pixel electrodes 20 and the TFTs 22.

On the other hand, the opposite substrate 12 comprises a rectangular insulating substrate, e.g., a rectangular glass substrate 30 having a rectangular display region 12a formed on the surface. Formed in the display region 12a are a color filter and a black matrix 32, the color filter including red colored layers 34R, green colored layers 34G and blue colored layers 34B. Also, a large number of rod-like spacers 36 projecting from the opposite substrate 12 in a direction substantially perpendicular to the main surface of the opposite substrate 12 are integrally formed by stacking the colored layers 34R, 34G and 34B one upon the other. These spacers 36 are disposed on a shielding layer 32 and positioned to face the scanning lines 18 arranged within a non-pixel portion on the side of the array substrate 10.

An opposite electrode 38 consisting of ITO is formed to cover the black matrix 32 and the colored layers 34R, 34G, 34B. Also, an alignment film 40 is formed to cover the opposite electrode 38.

The peripheral portions of the array substrate 10 and the opposite substrate 12 constructed as described above are bonded to each other with a seal of a sealing agent 42. The seal of the sealing agent 42 is formed in the shape of a rectangular frame to surround the display regions 10a, 12a of the array substrate 10 and the opposite substrate 12. The extended end surface of each spacer 36 is in contact with a region above the scanning line 18 of the array substrate 10. As a result, the array substrate 10 and the opposite substrate 12 are positioned to face each other with a predetermined gap, e.g., 5 μm, defined therebetween.

A liquid crystal material 14 is injected into the gap between the array substrate 10 and the opposite substrate 12 through an injecting port 44 formed in the seal of the sealing agent 42. After injection of the liquid crystal composition 14, the injecting port 44 is sealed with a sealing material.

The liquid crystal display cell of the construction described above is manufactured as follows.

In the first step, the array substrate 10 and the opposite substrate 12 each constructed as described above are prepared as shown in FIG. 2. Then, a sealing agent 42 is applied to a main surface of the array substrate 10 so as to form a seal surrounding the display region 10a. The seal of the sealing agent 42 should be, for example, about 200 μm in width and about 25 μm in height. Incidentally, the liquid crystal injecting port 44 is formed in a part of the seal of the sealing agent 42.

The sealing agent 42 is prepared by mixing an amine series compound acting as a curing accelerator, propyleneglycol monoethylether acetate having a boiling point of 162° C., filler, and the like with bisphenol A type epoxy resin ($C_{15}H_{16}O_2$) having a molecular weight of 228.291.

Figure 4A:
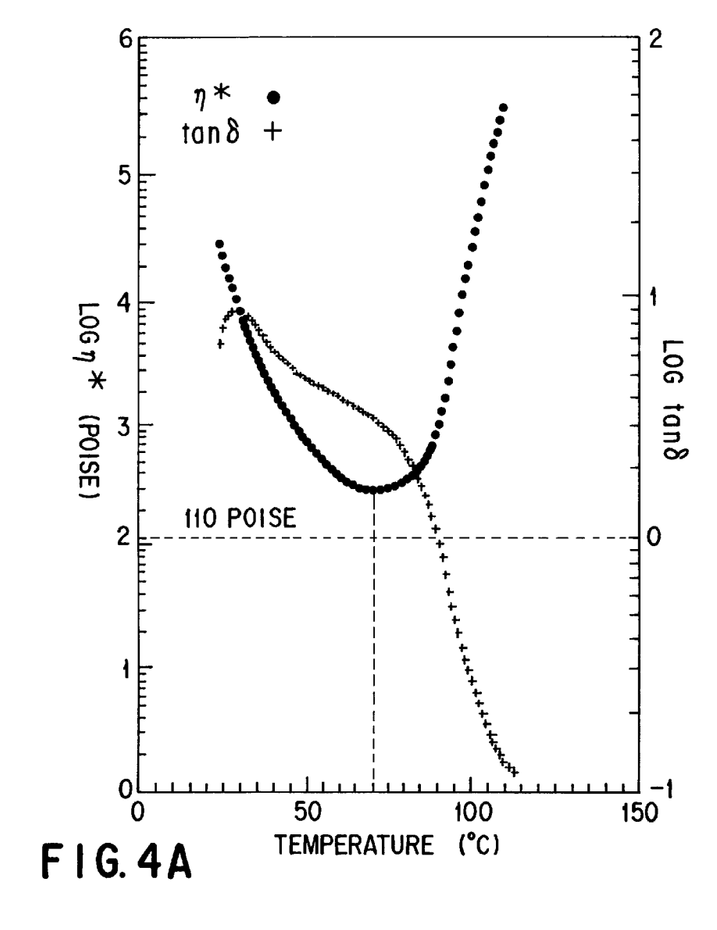
FIG. 4A is a graph showing the kinematic elasticoviscosity characteristics of the sealing agent used in the manufacturing method according to one embodiment of the present invention.
Figure 4B:
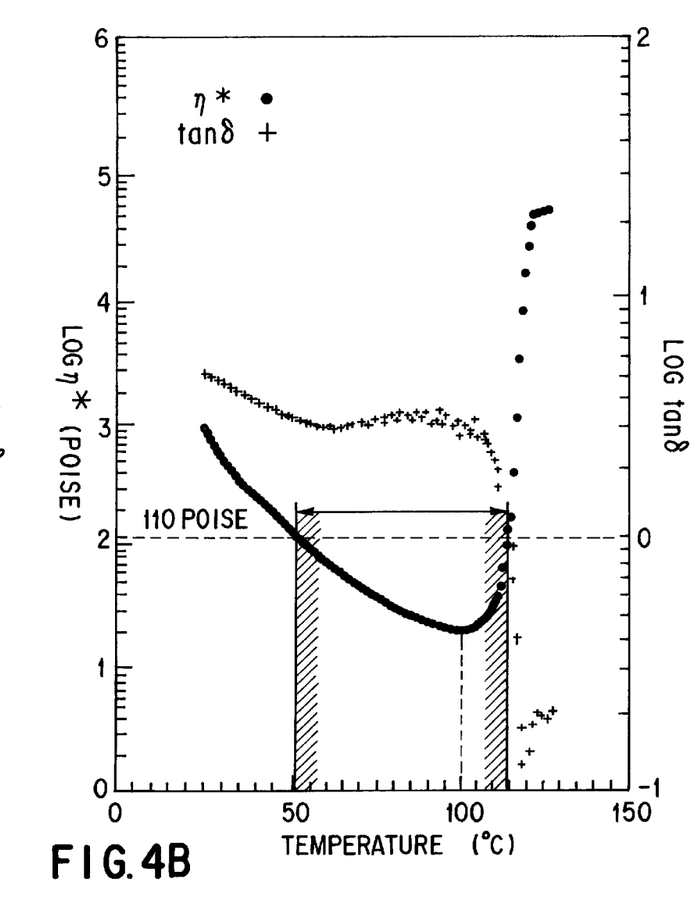
FIG. 4B is a graph showing the kinematic elasticoviscosity characteristics of the conventional sealing agent.

The kinematic elasticoviscosity characteristics, i.e., complex viscosity η and dissipation factor tan δ, of the sealing agent 42 were measured, with the results as shown in FIG. 4A. For comparison, FIG. 4B shows the kinematic elasticoviscosity characteristics of the conventional sealing agent, which was prepared by mixing adipic acid dihydrazide acting as a curing agent, an urea series compound acting as a curing accelerator, and methyl carbitol (boiling point of 194° C.) acting as a solvent with bisphenol F type epoxy resin ($C_{13}H_{12}O_2$) having a molecular weight of 200.237.

The kinematic elasticoviscosity characteristics were measured as follows. Specifically, a sample of the sealing agent expanded to form a thin body was heated at 85° C. for 20 minutes while stirring the sample several times every 5 minutes so as to remove the solvent. Then, the complex viscosity η and dissipation factor tan δ were measured by using a measuring apparatus and under the conditions given below:

Measuring apparatus: MR-300 soliquid meter (manufactured by Rheologi Inc.);

Measuring system: parallel disk (parallel plate) type (disk diameter of 1.8 mm, gap of about 0.5 mm);

Temperature range: 25° C. (room temperature) to about 160° C.;

Temperature elevation rate: 10° C./min;

Amplitude: 0.5 deg;

Frequency: 0.5 Hz;

Wire: diameter of 1.0 mm;

Measuring atmosphere: within $N_2$ gas stream.

As shown in FIG. 4A, the viscosity of the sealing agent prepared for this embodiment was not lowered to 110 poises at which the bubble generation tends to take place in the sealing step, though the viscosity was certainly lowered by the heating. On the other hand, the viscosity of the conventional sealing agent was made lower than 110 poises within the temperature range of 50 to 120° C., as shown in FIG. 4B.

Figure 5:
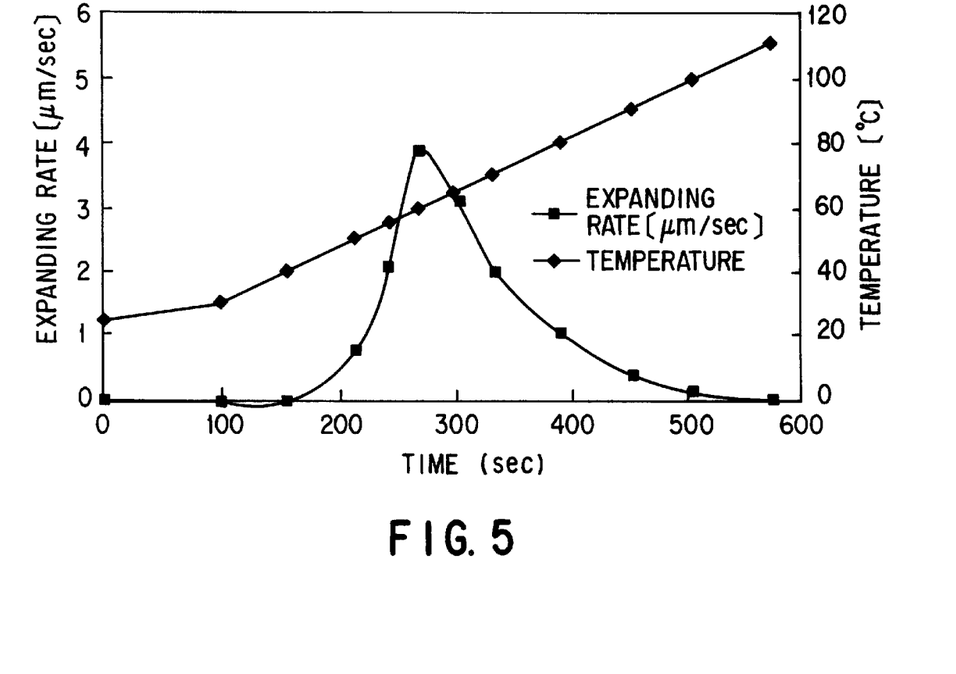
FIG. 5 is a graph showing the expanding rate of the sealing agent used in the embodiment of the present invention.

The expansion rate of the sealing agent 42 prepared for this embodiment was measured under the temperature elevation rate of 10° C./min and the pressure of 0.4 kgf/cm², with the results as shown in FIG. 5. FIG. 5 shows that, where the expansion rate of the sealing agent is set at 4 μm/sec or less, e.g., at 3.8 μm/sec, bubbles are not generated within the sealing agent layer even if the sealing agent layer is heated under a relatively high temperature elevation rate (10° C./min).

In the manufacturing method of the present embodiment, the peripheral region surrounding the display region 10a of the array substrate 10 is coated by the known method with the sealing agent 42 prepared as described above, followed by aligning the opposite substrate 12 on the array substrate 10. Then, these two substrates are provisionally fixed to each other with an adhesive or the like so as to prepare a cell assembly.

In the next step, the cell assembly was compressed to 600 gf/cm² at a room temperature by using a one-by-one sealing apparatus, and then heated for 23 minutes from the initial temperature of 25° C. (room temperature) to the aimed temperature of 160° C. under a temperature elevation rate of 10° C./min so as to cure the sealing agent 42. After releasing the evacuation in the sealing apparatus, the cell assembly is cooled to the room temperature, thereby completing the cell assembly. Break of the sealing agent layer 42 was not generated and bubbles were not generated at all within the sealing agent layer 42 in this heating step.

Then, the liquid crystal composition 14 was injected into the vacant cell of the resultant cell assembly through the liquid crystal injecting port of the sealing agent layer, followed by sealing the injecting port 44 with a sealing material such as an ultraviolet curing resin, thereby preparing a desired liquid crystal display cell.

In this embodiment, a vacuum pressurizing type sealing apparatus, in which the cell assembly is pressurized by vacuum suction of the air within a hermetic container housing the cell assembly, can be used as the one-by-one sealing apparatus.

Figure 6:
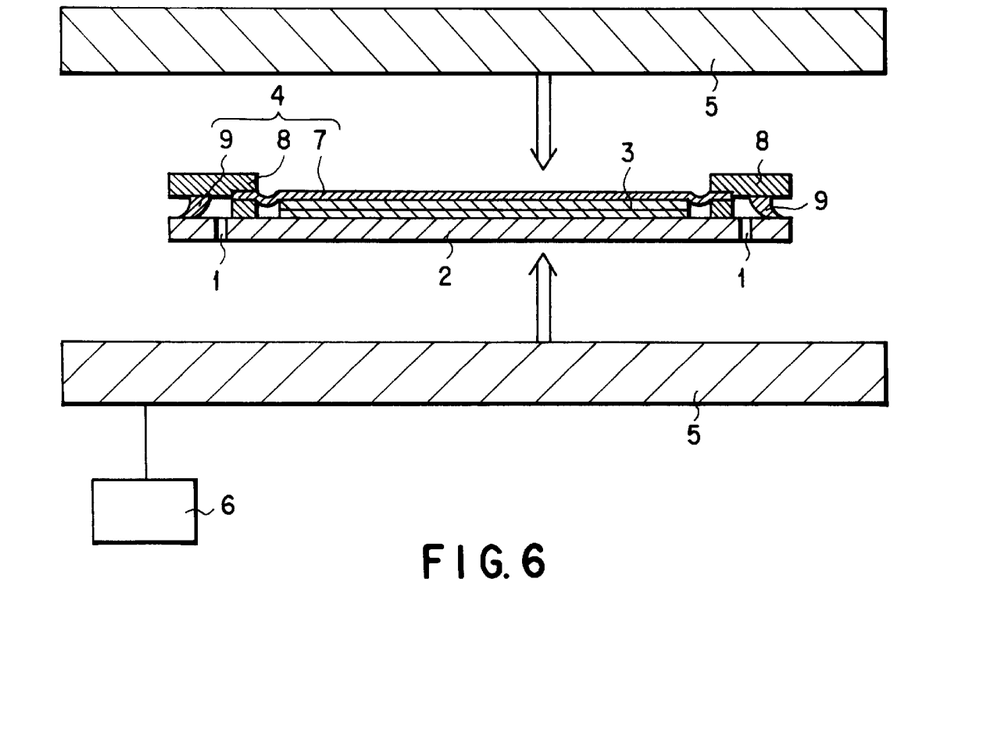
FIG. 6 is a cross sectional view schematically showing the construction of a one-by-one sealing apparatus used in the embodiment of the present invention.

To be more specific, FIG. 6 shows the construction of the one-by-one sealing apparatus. As shown in the drawing, the sealing apparatus comprises a plate-like lower tool 2 made of a metal, glass, a ceramic material, etc. and provided with a vacuum suction hole 1, an upper tool 4 covering the upper surface of a cell assembly 3 set on the upper surface of the lower tool 2, a vacuum pump (not shown) for discharging the air from within a hermetic space defined between the lower tool 2 and the upper tool 4 to the outside through the vacuum suction hole 1 made in the lower tool 2, a pair of plate-like upper and lower electric heaters 5 functioning as a heating means, and a heating control section 6 for controlling the heating temperature of the electric heaters 5.

The upper tool 4 includes a rectangular pressurizing sheet 7 covering the upper surface of the cell assembly 3 in contact with the cell assembly 3, a rectangular outer frame 8 for holding the peripheral portion of the pressurizing sheet 7, and a packing 9 vertically extending downward from a peripheral portion of the outer frame 8 such that the tip of the packing 9 is brought into contact with the lower tool 2 so as to achieve a hermetic sealing.

In the one-by-one sealing apparatus of the construction described above, the cell assembly 3 is held between the lower tool 2 and the upper tool 4. Then, the air within the hermetic space defined between the lower tool 2 and the upper tool 4 is discharged to the outside by vacuum suction so as to pressurize the cell assembly 3. Under this state, the cell assembly 3 is heated from above and below by the paired electric heaters 5 so as to thermally cure the sealing agent 42. As a result, the array substrate 10 and the opposite substrate 12 are bonded to each other.

In the one-by-one sealing apparatus described above, the electric heaters 5 arranged outside the lower tool 2 and the upper tool 4 are used as the heating means. Alternatively, it is possible to perform the heating by putting the entire upper and lower tools in a hot air circulating oven or in a far infrared ray oven.

Also, in the one-by-one sealing apparatus described above, the temperature elevation rate of the cell assembly 3 is controlled as desired by controlling the heating temperature of the electric heaters 5 in the heating control section 6. Alternatively, it is also possible to control the temperature elevation rate by changing the material of the lower tool 2 such as the metal, glass or ceramic material and by changing the thickness of the lower tool 2 so as to change the heat capacity. In this case, the construction of the heating control section 6 can be simplified.

Figure 7:
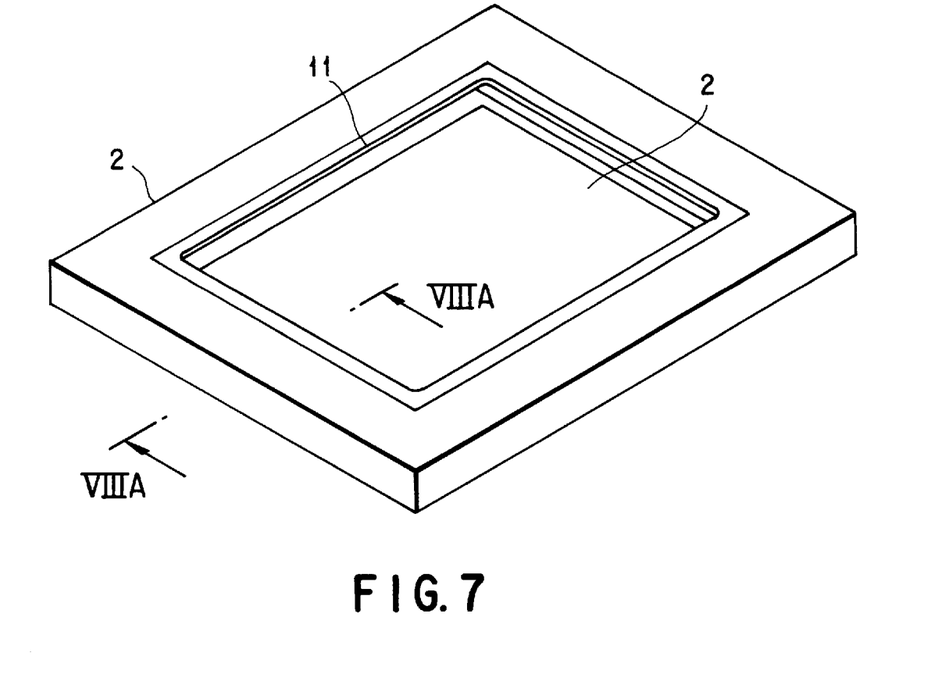
FIG. 7 is an oblique view showing the other lower tool of the one-by-one sealing apparatus used in the method of the present invention.
Figure 8A:
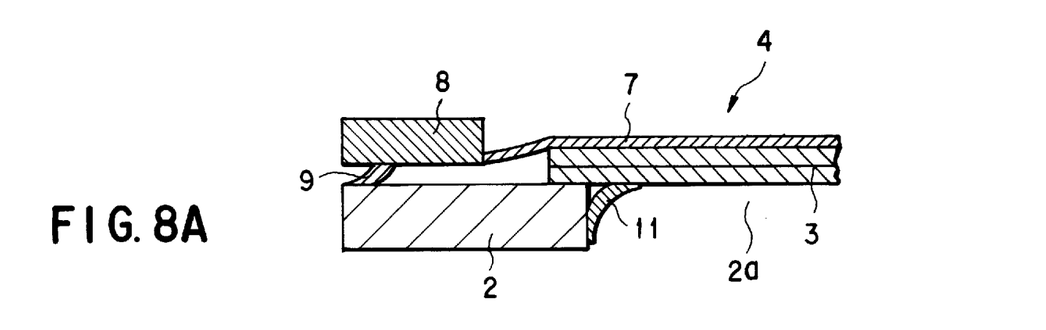
FIG. 8A is a cross sectional view along the line VIII—VIII shown in FIG. 7.

FIGS. 7 and 8A show a modification of the lower tool 2 of the one-by-one sealing apparatus. As shown in the drawings, the lower tool 2 in this modification is in the shape of a rectangular frame having a rectangular opening 2a formed in the central portion. Also, a pleat-like packing 11 is mounted along the entire inner surface of the frame. The opening 2a of the lower tool 2 is sized smaller than the cell assembly 3, and the packing 11 is made of a soft material such as a soft silicone rubber. During the thermal curing step, the peripheral portion of the cell assembly 3 is disposed on the upper surface of the lower tool 2, and the packing 11 is hermetically brought into contact with the lower surface of the cell assembly 3.

Figure 8B:
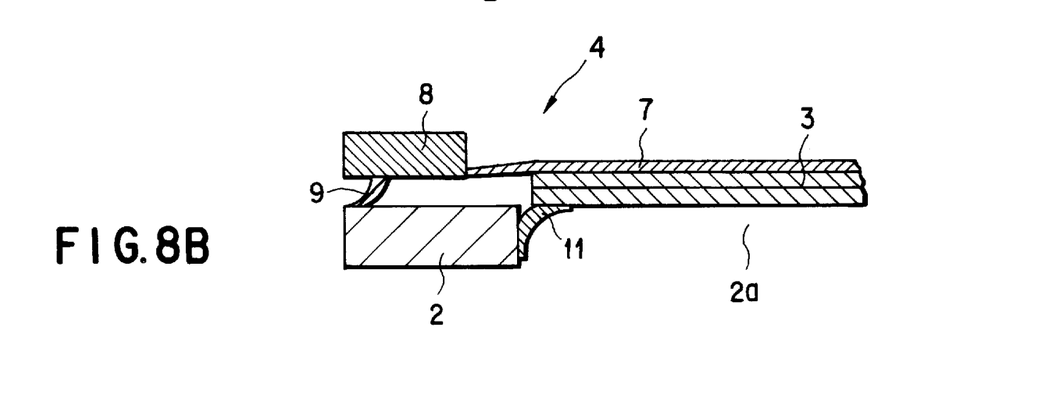
FIG. 8B is a cross sectional view corresponding to FIG. 8A and showing a modification of the lower tool shown in FIG. 7.

FIG. 8B shows another modification of the frame-like lower tool 2. In this modification, the rectangular opening 2a is sized somewhat larger than the cell assembly 3. In this modification, the cell assembly 3 is disposed on the packing 11 mounted to the inner surface of the frame. The packing 11 is made of rubber having a relatively high hardness, e.g., fluorine, silicon, silicon sponge, and the like, to enable the packing 11 to support sufficiently the cell assembly 3 disposed thereon.

The other construction of the one-by-one sealing apparatus comprising the frame-like lower tool 2 described above is equal to that of the apparatus shown in FIG. 6 and, thus, the detailed description thereof is omitted.

Where the sealing agent 42 is thermally cured by using the one-by-one sealing apparatus of the construction described above, the cell assembly 3 can be efficiently heated by the electric heaters 5 because the central portion of the lower tool is opened and the lower surface of the cell assembly 3 to be sealed is exposed through the opening 2a. Also, the presence of the opening 2a decreases the heat capacity of the lower tool 2 so as to further improve the heating efficiency of the cell assembly 3. It should also be noted that the pleat-like packing 11 is in contact with the lower surface of the cell assembly 3. Therefore, a good airtight condition can be maintained to prevent the air leakage, even if the cell assembly 3 has a somewhat irregular surface or is warped. As a result, a vacuum pressurizing can be applied stably to the cell assembly 3.

It should also be noted that, in the one-by-one sealing apparatus shown in FIG. 8B, the cell assembly 3 is in contact with only the packing 11 on the inner surface of the frame. Since the cell assembly 3 is not in contact with the lower tool 2 made of, for example, a ceramic material, the planar temperature distribution of the cell assembly 3 can be made uniform. As a result, it is possible to prevent a positional deviation of the two substrates.

The present invention is not limited to the embodiments described above, and various modifications are available within the technical scope of the present invention. For example, in the embodiment described above, a resin composition comprising bisphenol A type epoxy resin as a main component, an amine series compound acting as a curing accelerator, and propyleneglycol monoethylether acetate acting as a solvent is used as the sealing agent. However, the sealing agent used in the present invention is not limited to such a resin composition. Specifically, it is possible to use as the sealing agent a resin composition differing in the molecular weight of the main component resin, and in the kind and mixing ratio of the curing agent and the solvent, as far as the composition maintains a viscosity of at least 110 poises within the temperature range (50 to 120° C.) employed in the sealing step of the substrates.

Further, the sealing agent is not limited to a heat curing type. Specifically, it is possible to use a sealing agent containing as a main component a resin of ultraviolet light curing type or an ultraviolet light heat curing type, with substantially the same effect.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A method of manufacturing a liquid crystal display cell, comprising the steps of:

applying a sealing agent to a surface of a first substrate, forming a seal surrounding a periphery of a display region of the first substrate;

arranging a second substrate to face the first substrate a predetermined distance apart from the surface of the first substrate;

heating the sealing agent while pressurizing the first and second substrates to cure the sealing agent so as to seal the first and second substrates; and injecting a liquid crystal material into the gap between the first and second substrates;

wherein the sealing agent maintains a viscosity of at least 110 poises in the curing step of the sealing agent.

2. A method of manufacturing a liquid crystal display cell according to claim 1, wherein the sealing agent exhibits an expansion rate of 4 $\mu$m/sec or less throughout the curing step of the sealing agent.

3. A method of manufacturing a liquid crystal display cell according to claim 1, wherein at least one of the first and second substrates are heated in the curing step of the sealing agent such that the sealing agent is heated at a temperature elevation rate of 5 to 30° C./min.

4. A method of manufacturing a liquid crystal display cell according to claim 3, wherein the first and second substrates are heated in the curing step of the sealing agent such that the sealing agent is heated at a temperature elevation rate of 7 to 14° C./min.

5. A method of manufacturing a liquid crystal display cell according to claim 1, wherein the sealing of the first and second substrates by heating under pressure in the curing step of the sealing agent is carried out for each pair of the first and second substrates.

6. A method of manufacturing a liquid crystal display cell according to claim 1, wherein a gap between the first and second substrates after the curing step of the sealing agent is set at 3 to 5 $\mu$m.

7. A method of manufacturing a liquid crystal display cell according to claim 1, wherein the sealing agent contains bisphenol A type epoxy resin as a main component.

8. A method of manufacturing a liquid crystal display cell, comprising the steps of:

applying a sealing agent to a surface of a first substrate, forming a seal surrounding a periphery of a display region of the first substrate;

arranging a second substrate to face the first substrate a predetermined distance apart from the surface of the first substrate;

heating the sealing agent while pressurizing the first and second substrates to cure the sealing agent so as to seal the first and second substrates; and injecting a liquid crystal material into the gap between the first and second substrates;

wherein the sealing agent exhibits an expansion rate of 4 $\mu$m/sec or less throughout the curing step of the sealing agent.

9. A method of manufacturing a liquid crystal display cell according to claim 8, wherein the sealing agent contains as a main component bisphenol A type epoxy resin.

* * * * *